M. BÖCKMAN.
Potato-Planter.

No. 216,934. Patented July 1, 1879.

M. BÖCKMAN.
Potato-Planter.

No. 216,934. Patented July 1, 1879.

Attest.
Chas. H. Neale
D. P. Plowl

Inventor.
Marcus Böckman
by his attorney

UNITED STATES PATENT OFFICE.

MARCUS BÖCKMAN, OF BROOKLYN, NEW YORK.

IMPROVEMENT IN POTATO-PLANTERS.

Specification forming part of Letters Patent No. 216,934, dated July 1, 1879; application filed May 28, 1878.

*To all whom it may concern:*

Be it known that I, MARCUS BÖCKMAN, of Brooklyn, in the county of Kings and State of New York, have invented certain new and useful Improvements in Potato-Planters, of which the following is a full, clear, and exact description.

This invention relates to a machine for planting potatoes and other seeds in hills.

My improvements are so distinctly set forth in the several claims at the close of this specification that a specific enumeration thereof at this point is unnecessary.

Figure 1:
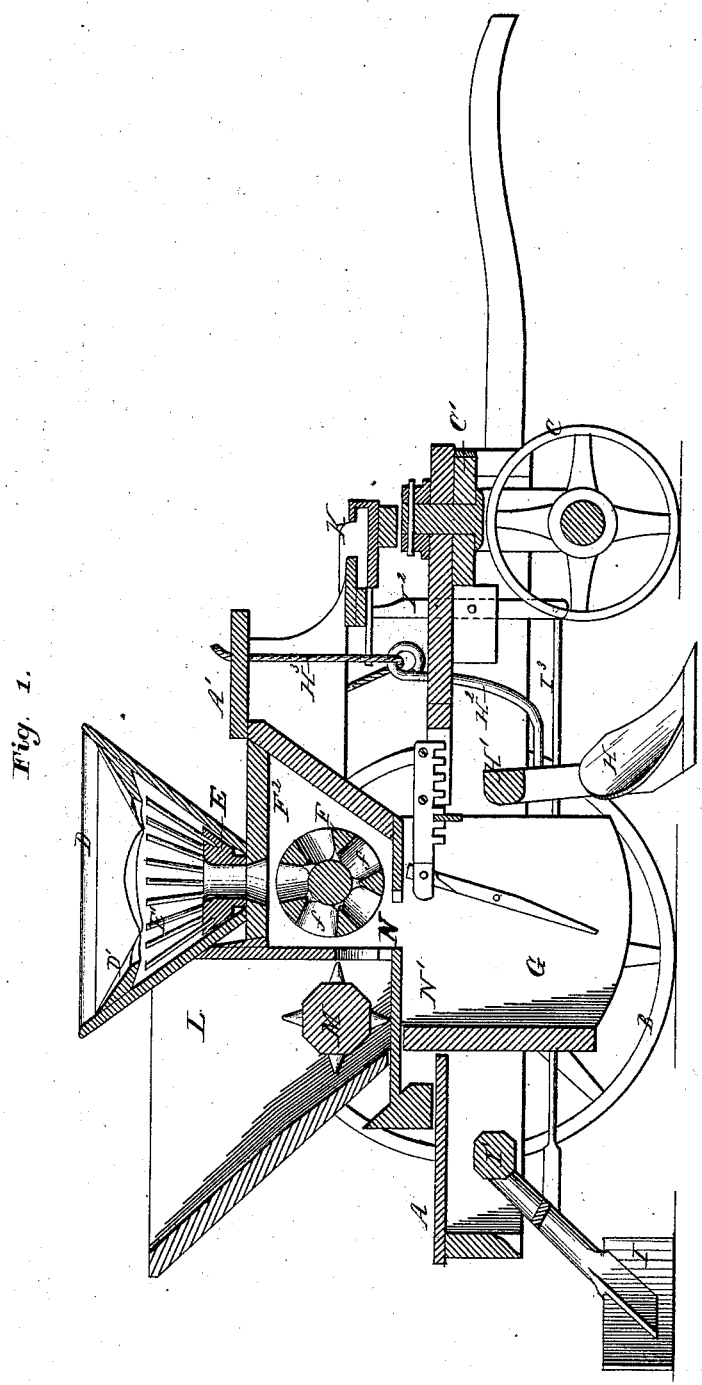
Figure 2:
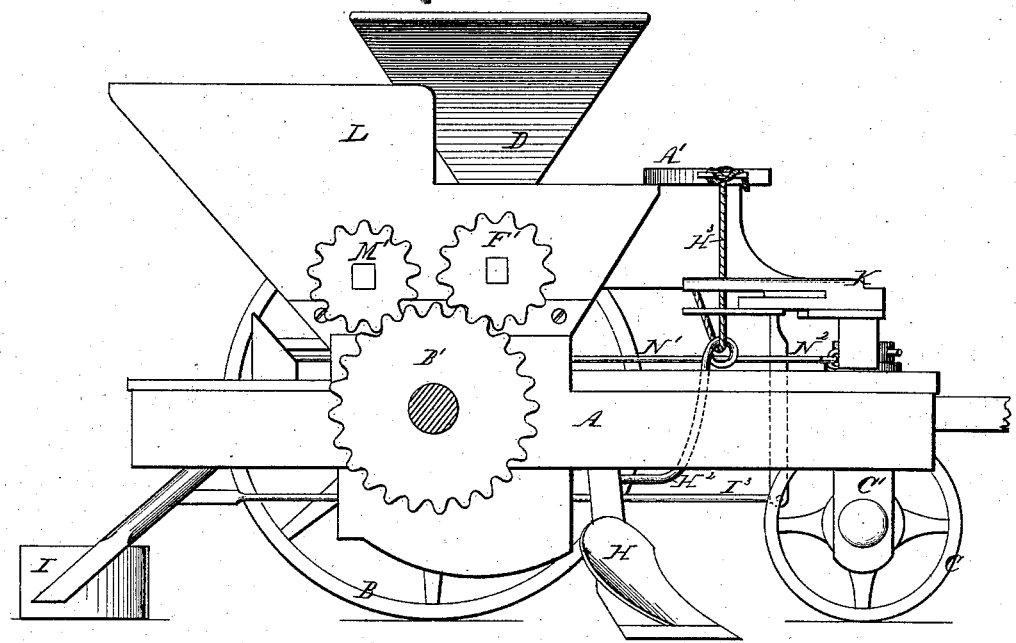
Figure 3:
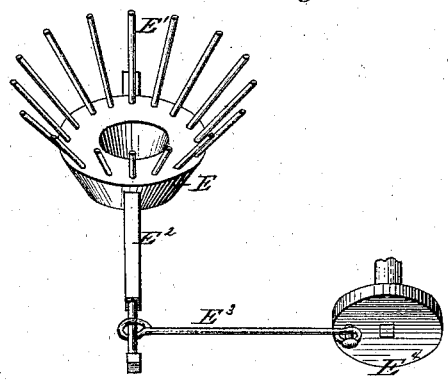

In the accompanying drawings, Figure 1 is a longitudinal section of my improved machine. Fig. 2 is a side elevation of the same. Fig. 3 is a detail view of the shaker and connections.

The same letters of reference are used in all the figures in the designation of identical parts.

The frame-work A of the machine is supported upon the large drive-wheels B and the front guide-wheel, C. The wheels B have short journals, turning in bearings on the side sills of frame A, so that said wheels can turn independently of one another. The guide-wheel C is hung in a yoke, C', swiveled in frame A, as shown in Fig. 1.

The potatoes or other seeds to be planted are placed in a converging hopper, D, the bottom of which is composed of a disk, E, provided with an annular series of upwardly-projecting prongs, $E^1$, along its edge. The upper ends of the prongs $E^1$ are covered by an overhanging ledge or flange, D', on the interior of hopper D. The disk E is suitably journaled for horizontal oscillation, and constitutes, with its prongs $E^1$, a grated shaker for agitating the potatoes, to facilitate and insure their continuous downward feed. As a means for automatically oscillating the grated shaker, it is provided with a lateral arm, $E^2$, which projects through a slot in the side of hopper D, and is connected by a rod, $E^3$, to a rotating crank-disk, $E^4$, on the agitator of the fertilizer attachment, hereinafter referred to. The potatoes pass through a central hole in the grated shaker to a revolving drum, F, provided with a series of pockets, $f$. Each pocket is adapted to receive the required quantity of seed for one hill.

The drum F is journaled in the sides of the hopper, and one of its journals carries a spur-wheel. $F^1$, which meshes into and is driven by the spur-wheel B' on the journal of one of the drive-wheels B. The size of the pocketed drum, the number of pockets, and the relative sizes of the spur-wheels B' and $F^1$ determine the distance between the hills. From the pockets of the drum F the potatoes fall through a spout, G, into the trench made by the plow or furrow-opener H. The standard of this furrow-opener is secured to a rocking bar, $H^1$, journaled in the side sills of the frame A, and it also is provided with an arm, $H^2$, by means of which it may be turned and held in working position, as shown in the drawings, the arm being provided with a rope or chain, $H^3$, passing to the driver's seat A'.

When the furrow-opener is in working position the rope or chain $H^3$ should be suitably fastened. In practice, the arm $H^2$ will be weighted, so that on the release of the rope it will turn the furrow-opener back, and hold it elevated above the ground. The earth thrown up by the furrow-opener is scraped back into the trench, to cover the seed, by the coverers I, arranged convergingly, as usual, and secured with their standards to a rock-bar, $I^1$, journaled in the side sills of frame A, so that the carriers may be elevated above the ground. This is accomplished by means of a lever, $I^2$, one arm of which is connected to the standard of one of the coverers by a rod, $I^3$, while its other arm is connected by a rod to the sliding foot-board K in front of the driver's seat A'. To elevate the coverers the driver pushes this foot-board K forward. The foot-board is suitably constructed, so that this operation can be performed with ease. The foot-board slides on suitable fixed guides.

The planter is provided with a fertilizer attachment, consisting of a hopper, L, and an agitator, M, in the bottom of said hopper. The agitator is journaled in the sides of the hopper, and one of its journals carries a spur-wheel, M', which meshes into and is driven by spur-wheel B'. The agitator feeds the fertilizing agent through an opening in the front side of hopper L into the lower part of the chamber $F^2$, occupied by the pocketed drum F, from which chamber it falls through spout G into the furrow.

In order to suspend the dropping of seed and of the fertilizing agent in turning at the end of each row of hills, I introduce a slide, N, between the upper end of spout G and the chamber $F^2$ of drum F. In the example shown this slide extends under and forms the bottom of hopper L. It is provided with a bar, $N^1$, which extends forward, and is connected by a rod, $N^2$, to the sliding foot-board K, the arrangement being such that on moving the foot-board forward the slide N will be drawn over the spout G and cover the opening between drum-chamber $F^2$ and said spout. Thus by a single movement of the foot-board the coverers can be lifted and the slide N drawn over the spout, as is required in suspending the planting operation, while a reverse movement of the foot-board will open the spout and lower the coverers preparatory to the resumption of the planting operation.

What I claim as my invention, and desire to secure by Letters Patent, is—

1. The combination, substantially as specified, of the fixed seed-hopper, the upright grated shaker-cage therein, and the pocketed drum under the discharge-opening of the shaker-cage and hopper-bottom.

2. The combination, substantially as specified, of the seed-hopper provided with the interior overhung ledge or flange, the grated shaker therein, and the pocketed drum.

3. The combination, substantially as specified, of the fertilizer-hopper, the agitator therein, the seed-hopper, the pocketed drum in a chamber under the seed-hopper and in front of the fertilizer-hopper, and the slide for governing the discharge-opening of said drum-chamber.

4. The combination, substantially as specified, of the sliding foot-board, the slide for governing the discharge-opening of drum-chamber $F^2$, the coverers, and mechanism for connecting the foot-board to said slide and said coverers.

In testimony whereof I have signed my name to the foregoing specification in the presence of two subscribing witnesses.

MARCUS BÖCKMAN.

Witnesses:
 CHAS. A. NEALE,
 B. E. J. EILS.